Sept. 10, 1963

C. T. GATES 3,103,163

METAL SHREDDER

Filed Jan. 7, 1959

INVENTOR
Charles T. Gates

BY Mason, Fenwick & Lawrence
ATTORNEYS

Sept. 10, 1963
C. T. GATES
METAL SHREDDER
3,103,163
Filed Jan. 7, 1959
3 Sheets-Sheet 2
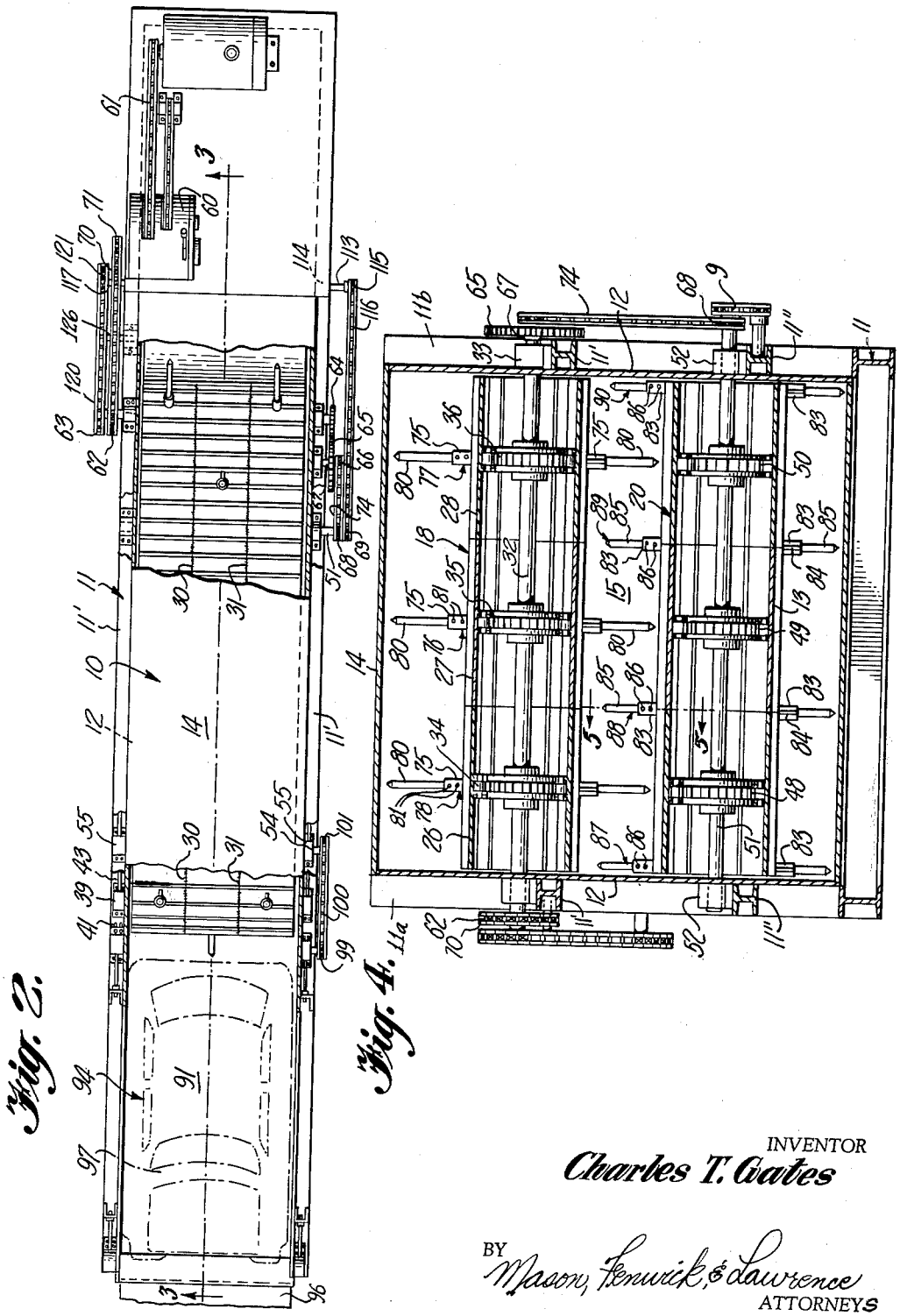
INVENTOR
Charles T. Gates
BY Mason, Fenwick, & Lawrence
ATTORNEYS Sept. 10, 1963
C. T. GATES
3,103,163
METAL SHREDDER
Filed Jan. 7, 1959
3 Sheets-Sheet 3
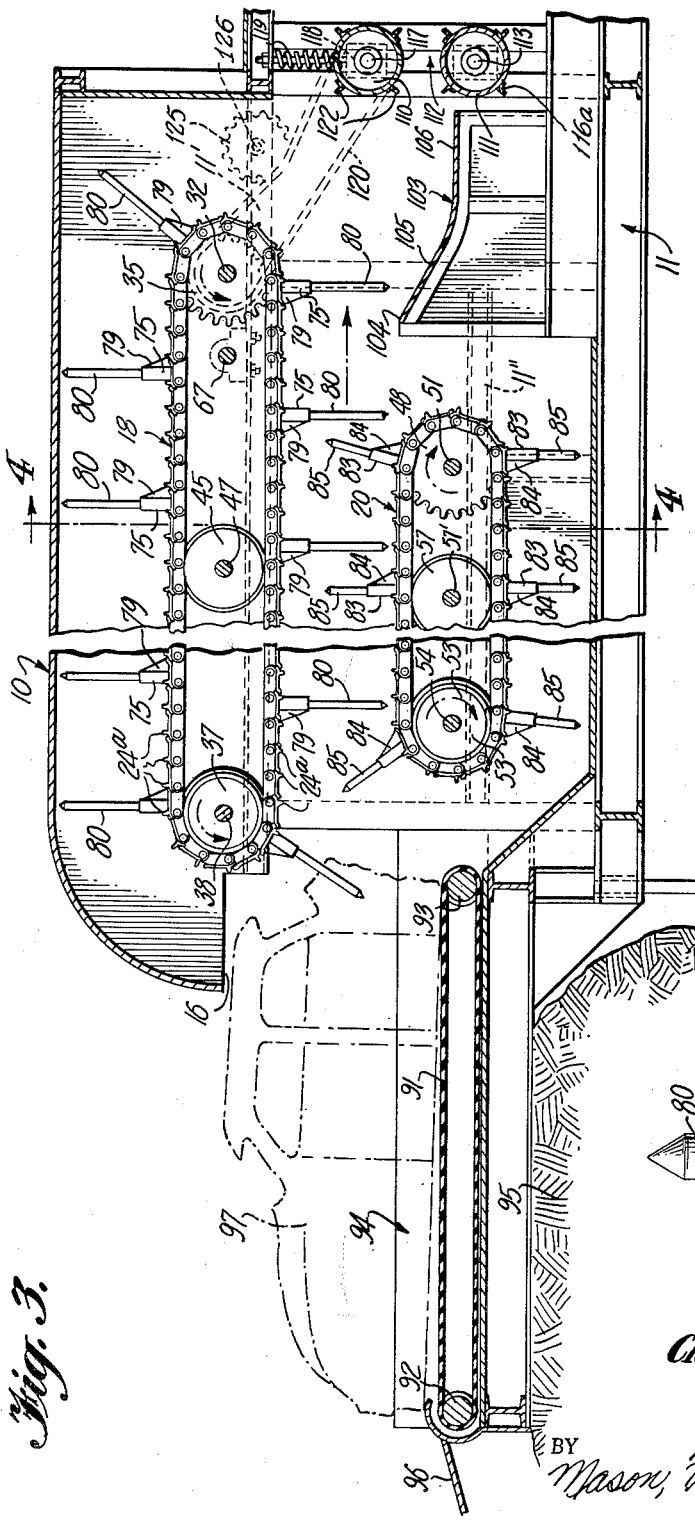
INVENTOR
Charles T. Gates
BY
Mason, Fenwick & Lawrence
ATTORNEYS United States Patent Office 3,103,163
Patented Sept. 10, 1963

3,103,163
METAL SHREDDER
Charles T. Gates, Wendell, Idaho; Ruth Gates, special administratrix of Charles T. Gates, deceased
Filed Jan. 7, 1959, Ser. No. 785,468
1 Claim. (Cl. 100—98)

This invention relates to a metal shredder, and more particularly to a transportable scrap metal salvage machine for reducing relatively thin walled metal bodies to a compact mass suitable for feeding into a melting furnace.

When old automobiles are junked, the motors, gears, and the other heavy parts are removed and sold to melting furnaces, but the bodies of the automobiles are left to rust in lots or fields because the bulk of these bodies is very great in comparison with the amount of metal contained in them. The cost of transportation makes it unprofitable to salvage the material. Also, the bulk of the material is such that it would be uneconomical to redesign melting furnaces to handle this type of scrap metal.

At a great many places generally throughout the country there are acres of junked automobile bodies, which create an eyesore in the community where they are located. The potential source of scrap cited is very great if a means were provided to reduce this source of scrap metal to a usable commodity for the metal melting furnace.

Consequently, it is an object of the present invention to provide a unit which may be transported from junkyard to junkyard for reducing the automobile bodies in these junkyards to compact masses which can then be economically transported to melting furnaces.

A further object of the invention is to provide a salvage unit for salvaging the metal in automobile bodies which is automatic in operation, whereby automobile bodies may be fed into one part of the unit and reduced to compact masses of metal which are removed from another part of the unit.

Other objects and advantages of the present invention will become apparent to those skilled in the art from the following description when read in conjunction with the acompanying drawings, wherein:

FIGURE 2 is a plan view of the salvaging unit shown in FIGURE 1, part of the top deck, or roof being broken away to show the flight of the shredder teeth conveyor;

FIGURE 3 is an enlarged vertical sectional view taken on the line 3—3 of FIGURE 2;

FIGURE 4 is a transverse vertical sectional view taken on the line 4—4 of FIGURE 3;

FIGURE 5 is an enlarged vertical sectional view of one of the holder and feeder teeth, taken on the line 5—5 of FIGURE 4;

FIGURE 6 is a vertical sectional view taken on the line 6—6 of FIGURE 5.

Figure 1:
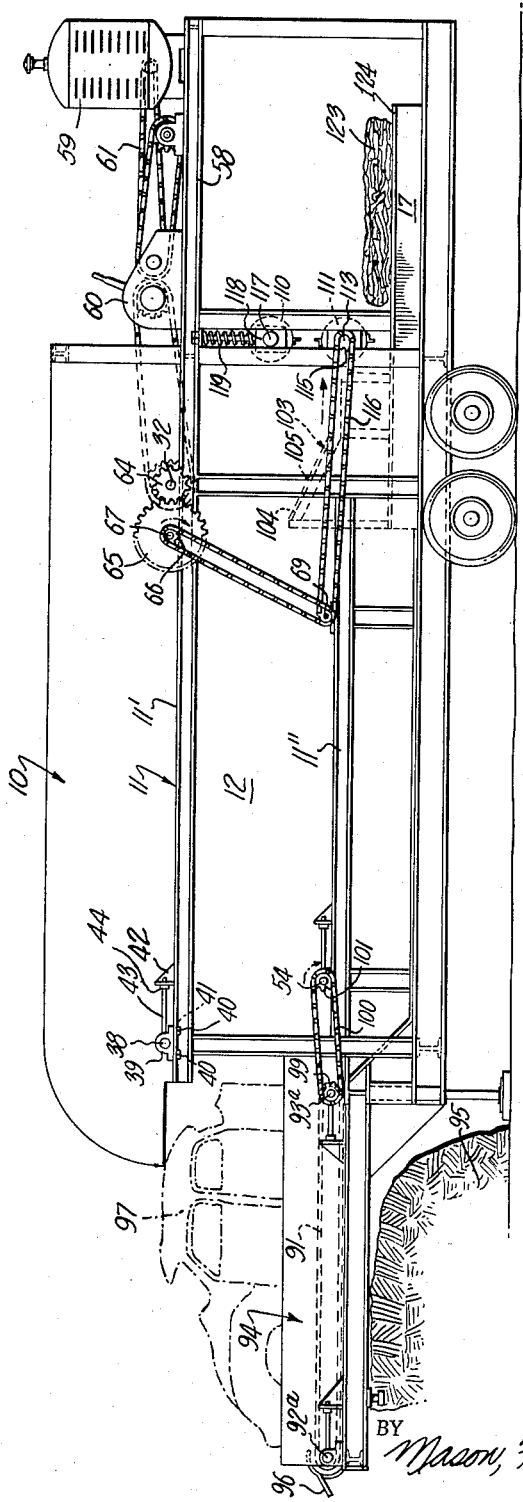
FIGURE 1 is a side elevation of the salvaging unit of the present invention.

Adverting now to the drawings, and particularly to FIGURES 1 and 3, there is shown a wheeled vehicle 10, comprising a framework 11 made of heavy steel beams with steel plate side walls 12, bottom 13, and roof 14 generally defining a tunnel 15 through which automobile bodies may pass from the entrance 16 to the discharge 17.

A pair of horizontally disposed conveyor belts 18 and 20 are mounted within the tunnel 15 in spaced apart vertical juxtaposed position, so that the under portion of the belt 18 confronts the top portion of the belt 20.

The conveyor belts 18 and 20 are of the metal roller link chain type, the links of the chain being a pair of side members 21 pivotally joined together with the adjacent pair of side members of the next link by a pintle 22 which passes through a roller 23. A shoe 24 is mounted on each link by bolts 25 with the leading edge of one shoe overlapping the trailing edge of the next shoe. The conveyor belts 18 and 20 may be conveniently formed of track links for a crawler tractor. As shown in FIGURE 2, three crawler tractor tracks 26, 27, and 28 are mounted side by side with the shoes welded together end to end, as at 30 and 31, to form a belt having the width of a car body.

The belt 18 is mounted at one end on a shaft 32 which is journaled in bearing 33 mounted on a beam 11' of framework 11, as seen in FIGURE 4. Three sprocket wheels 34, 35, and 36 are fixedly mounted on the shaft 32 and spaced apart to intermesh with the rollers 23 of each of the crawler tracks. The opposite end of the belt is mounted on three of the wheels 37 which are mounted on a shaft 38 journaled in a pair of pillow block bearings 39, one at either side of the unit 10. The pillow block bearings 39 are mounted on the beam 11' of the framework 11, as shown in FIGURES 1 and 2, by means of depending lugs 40, which engage a slot 41 in the beam. An apertured bracket 42 is welded to the beam and a rod 43 having one end attached to the pillow block bearing and the other end threaded and extended through the aperture in the bracket 42 to provide a means for tightening the belt 18 by advancing a nut 44 toward the end of the rod 43. The track formed by the sides 21 of the chain links travels over the wheels 37. A plurality of bogey wheels 45 mounted on jack shafts 47 spaced along the flight of the belt 18, provide a backing support for the belt.

The belt 20 is somewhat shorter than the belt 18, and it is mounted in a manner similar to that for the belt 18. One end of the belt 20 is mounted on the sprocket wheels 48, 49, and 50, which are mounted on a shaft 51 journaled in bearings 52 on the beam 11" of framework 11. The tracks of the chain links are passed over wheels 53 mounted on the shaft 54 at the other end of the belt. The shaft 54 is journaled in a pair of pillow block bearings 55 which are similar to the bearings 39, and are provided for tightening the belt 20. A plurality of bogey wheels 57, mounted on shaft 57' at spaced points along the flight of the belt, provide backing support for the belt 20.

An elevated engine platform 58 is provided at the discharge end of the unit. An engine 59 and a reduction gear and control box 60 are attached to the platform 58.

Power is transmitted from the engine 59 to the reduction gear box 60 by means of roller chain 61.

The drive sprockets 62 and 63 are mounted on one of the ends of the shaft 32, which is extended beyond the side wall plate 12, and a spur gear 64 is mounted on the other end of the shaft 32 which is extended through the opposite side wall of the unit. A spur gear 65 and a sprocket wheel 66 is mounted on a jack shaft 67 with with the spur gear 64 in mesh with the spur gear 65. The gear ratio between the spur gear 64 and spur gear 65 is 1 to 3, whereby the spur gear 65 will be driven at one-third the speed of the spur gear 64.

The sprocket wheels 68 and 69 are mounted on the extended end of the shaft 51.

A roller chain 70 in mesh with the output sprocket 71 of the reduction gear box 60, transmits power to the sprocket wheel 62 to rotate the shaft 32 and move the belt 18 in a counterclockwise direction, as seen in FIGURE 3. A roller chain 74 in mesh with the sprocket wheels 66 and 68 transmit power at a reduced r.p.m. to rotate the shaft 51 and move the belt 20 in a clockwise direction, as seen in FIGURE 3.

A plurality of sleeve type tubular brackets 75 are welded in longitudinally spaced relation to the shoes 24 and grousers 24a of the belt 18. As shown in FIGURES 2 and 4, there are three longitudinal rows of the brackets 75 with the inner row 76 of brackets spaced longitudinally intermediate the outer rows 77 and 78, respectively. The conveyor belt 18 travels in a counterclockwise direction, as seen in FIGURE 3, and each of the tubular brackets 75 are provided with a brace 79 on the trailing side of said brackets. Braces 79 are welded to the brackets 75 and the shoes 24. A stripper tooth 80 is mounted in each of the brackets 75, by means of a pair of set screws 81. The stripper teeth 80 may be conveniently made from a length of 2″ chrome vanadium steel shafting, made pointed at its outer end.

A plurality of tubular brackets 83 are mounted in longitudinally extending rows on the belt 20, and each of the brackets 83 are provided with a brace 84. The belt 20 moves in a clockwise direction, as seen in FIGURE 3, and the braces 84 are welded at the leading side of the brackets 83. A holding and feeder tooth 85 is mounted in each of the brackets 83, by means of set screws 86.

As seen in FIGURE 4, there are provided four longitudinally extending rows 87, 88, 89, and 90, of brackets 83. The brackets 83 are transversely offset with respect to the brackets 75, so that the stripper teeth 80 interdigitate with respect to the holding and feeder teeth 85, and due to the speed differential between the movements of the belts 18 and 20 the stripper teeth 80 pass between the holding and feeder teeth 85 in a combing-like manner.

A loading conveyor 91 is provided at the entrance to the tunnel 15. Automobile bodies to be reduced to compacted metal are placed on said conveyor. The conveyor 91 may be conveniently made from a strip of heavy rubber belting of the width of an automobile body, and mounted on the rollers 92 and 93, respectively, said rollers being mounted on shafts 92a and 93a, respectively. The shafts 92a and 93a are suitably journaled on a framework or loading platform 94, which is elevated above the main base frame members, so that the axes of the rollers 92, 93 are in a plane with the axes of the shafts 51 and 54.

A mound of earth 95 may be raised beneath the platform 94, and a ramp 96 is provided for pushing an automobile body 97 onto the conveyor 91, by means of a bulldozer (not shown). The shaft 93a is extended outward from the framework, and a sprocket wheel 99 is mounted thereon to receive a roller chain 100, which is driven from a sprocket 101, mounted on the extended end of the shaft 54.

When the machine of the present invention is placed in operation, the engine 59 through the gear reduction 60 rotates the shaft 32 in a counterclockwise direction and rotates the conveyor belt 18. By means of the spur gears 64 and 65, power is taken from the shaft 32 to reversely drive the shaft 51 in a clockwise direction, and to rotate the belt 20 at one-third the speed of the belt 18. Power is transmitted through the belt 20 to rotate the loading conveyor from the sprocket 101 mounted on the shaft 54, to the sprocket 99, which rotates the roller 93.

When the automobile body reaches the entrance 16 of the tunnel 15, the stripper teeth 80 impale the body from above, and draw it into the tunnel. The holder and feeder teeth 85 impale the body from beneath. Since the belt 18 is traveling at three times the speed of the belt 20, the stripper teeth tear, beat, and shred the automobile body as it is held back by the holder and feeder teeth 85. Although the teeth 85 hold the automobile body so that it can be shredded by the stripper teeth 80, they also feed the shreds of the body to the compacting rolls, soon to be described. Also, due to the relative speeds of the flights of the two belts, the shredded and beaten remains of the automobile body when they have passed through the tunnel 15, are of less length than the body in its original condition. It is considerably condensed, but it is not compacted.

A receiving platform 103 is provided to receive the shredded and beaten remains of the automobile body. The leading edge 104 of said platform is at the level of the belt 20, and the platform 103 slopes downward, as at 105, from its leading edge to a horizontal plane 106 at its rear edge. This permits the teeth 80 to give the mass a final push, and to place the mass at a better angle for withdrawal of the teeth 80. The speed of the belt 18 and the weight of the mass as it slides down the sloping portion 105 of the platform will extricate it from the teeth 80.

A pair of driven compression rollers 110 and 111 are transversely mounted on the framework 11, to present a horizontally extending nip 112 to the mass being shoved from the platform.

The roller 111 is mounted on a shaft 113, which is journaled in a pair of bearings 114, each of the bearings 114 being fixedly attached between two upright beams 11a and 11b at either side of the framework. A sprocket wheel 115 is journaled on the outer extended end of the shaft 113 for driving the roller 111 by means of a roller chain 116, which extends between the sprocket wheels 69 and 115. The shaft 113 is driven at the same speed as the shaft 51, but the surface speed of the roller 111 is less than the surface speed of the belt 20. The compression roller 111 is provided with a plurality of feeder cleats 116a to retard the forward movement of the mass, as long as it is being pushed by the stripper teeth to further condense the leading portion of the mass and to feed the mass through the compression rollers when it is no longer being pushed by the stripper teeth 80, as well as to offset the faster beating action of the compression roller 110, which will now be described.

The roller 110 is mounted on a shaft 117 journaled in a pair of vertically sliding bearings 118. The bearings 118 at either end of the shaft 117 slide in a track formed by the spaced beams 11a and 11b, and are biased by a pair of springs 119 toward the nip 112 of the rollers 110, 111. The weight of the roller 110 and the strong bias of the spring 119 exerts a compression force sufficient to compact the mass passing through the nip of the roller. The roller 110 is driven by a chain 120, which extends between the sprocket 63 and a sprocket 121 mounted on the end of the shaft 117. The speed of the shaft 117 is equal to the speed of the shaft 32. While the surface speed of the roller 110 is less than the surface speed of the belt 18 it is three times as fast as the surface speed of the roller 111. A plurality of beaters 122 which extend longitudinally of the surface of the roller 110 cause the roller 110 to exert a beating action on the mass. This beating action results from the increased r.p.m. of the roller 110 over that of the roller 111 and the yieldability of the mounting of the roller 110 as compared with the fixed mounting of the roller 111. The beaters 122 slip when in contact with the metal, and therefore, cam the roller 110 away from the mass. On the rebound of the roller 110 a blow is struck the mass in addition to the constant compressive force acting on the mass.

The pancake-like mass or bale 123 of densely compacted shredded metal is deposited on a product platform 124 after it passes from the rollers 110, 111.

An idler sprocket 125 mounted on a jack shaft 126 which is journaled in the framework 11 intermediate the flight of the chain 120 prevents slackening of the chain 120, due to the vertical movement of the shaft 117 and sprocket 110.

The time required for reducing an automobile body to a densed compacted pancake-like mass is approximately one minute from the time the automobile body is first acted on by the stripper teeth 80 until the compacted mass is deposited on the product platform 124.

The compacted mass 123 is a dense mass of metal having only a fraction of the bulk of the original automobile body and may be transported economically to a foundry for melting down and manufacture into useful products. The familiar automobile "graveyards" which are eyesores on the countryside will be eliminated.

While there has been disclosed in the foregoing description a practical embodiment of the scraap metal salvage machine in accordance with the present invention, it will be understood by those skilled in the art that variations in the implementation of the concept of the invention are within the purview and scope of the invention.

What is claimed is:

A scrap metal salvage machine for reducing thin-walled metal bodies to a compact mass comprising, an elongated body portion having a longitudinally extending tunnel therethrough and an intake end and an ejection end, a first belt mounted in said tunnel for revolution longitudinally of said tunnel, a second belt mounted below and in parallel relation to said first belt in said tunnel, stripper teeth upstandingly mounted on said first belt in longitudinally extending rows transversely of said belt, holding teeth mounted on said second belt in interdigital relation with respect to said stripper teeth, driving means for driving said belts at different relative speeds so that confronting flights of said belts move in the same direction from said intake end to said ejection end, said second belt moving continuously at a substantially slower speed than said first belt, a platform at said ejection end of said tunnel, a first roller journaled in fixed bearings mounted on said body portion in transverse relation to said platform and spaced from said belt flights, a second roller journaled in yieldably mounted bearings on said body portion in superposed parallel relation to said first roller, said first and second rollers providing between them a spaced apart nip into which shredded metal may be fed by said belts across said platform, a plurality of movement regulating cleats mounted on the periphery of said first roller, a plurality of beaters mounted on the periphery of said second roller, and means for driving said rollers including means for driving said first roller at substantially less speed than said second roller, and said first belt extending outward beyond the ends of said second belt so that said stripper teeth will first engage one of said metal bodies at the intake end of said tunnel and pull it between said belt flights and push the shredded metal across said platform at the ejection end of said tunnel to urge it between the nip of said rollers.

References Cited in the file of this patent
UNITED STATES PATENTS

| | | |
|---|---|---|
| 246,731 | Davis | Sept. 6, 1881 |
| 288,743 | Swingle | Nov. 20, 1883 |
| 291,425 | Thoens | Jan. 1, 1884 |
| 658,281 | Rom | Sept. 18, 1900 |
| 1,426,498 | Owen | Aug. 22, 1922 |
| 1,448,013 | Warren | Mar. 13, 1923 |
| 1,598,364 | Cassell et al. | Aug. 23, 1926 |
| 1,662,467 | Minshall | Mar. 13, 1928 |
| 1,704,823 | Denny | Mar. 12, 1929 |
| 1,917,164 | Street | July 4, 1933 |
| 1,966,109 | Wilson | July 10, 1934 |
| 2,059,229 | Gregg | Nov. 3, 1936 |
| 2,663,228 | Serpas | Dec. 22, 1953 |